US007202290B2

(12) United States Patent
Stuart, Jr. et al.

(10) Patent No.: US 7,202,290 B2
(45) Date of Patent: *Apr. 10, 2007

(54) MODIFIED ASPHALT COMPOSITIONS

(75) Inventors: Richard Kingsley Stuart, Jr., Longview, TX (US); Jeffery Lynn Presley, Kingsport, TN (US); Kenneth Francis Grzybowski, Temple Terrace, FL (US)

(73) Assignees: Eastman Chemical Company, Kingsport, TN (US); PRI Asphalt Technologies Inc., Tampa, FL (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/706,522

(22) Filed: Nov. 12, 2003

(65) Prior Publication Data

US 2005/0101702 A1 May 12, 2005

(51) Int. Cl.
*E01C 7/26* (2006.01)

(52) U.S. Cl. ....................................................... 524/68

(58) Field of Classification Search .................. 524/68
See application file for complete search history.

(56) References Cited

U.S. PATENT DOCUMENTS

| | | | |
|---|---|---|---|
| 3,896,069 A | 7/1975 | Kosaka et al. | |
| 4,091,134 A | 5/1978 | Uemura et al. | |
| 4,145,298 A | 3/1979 | Trepka | |
| 4,238,202 A | 12/1980 | Trepka et al. | |
| 4,240,946 A | 12/1980 | Hemersam | |
| 4,242,246 A | 12/1980 | Maldonado et al. | |
| 4,328,147 A | 5/1982 | Chang et al. | |
| 4,330,449 A | 5/1982 | Maldonado et al. | |
| 4,382,989 A | 5/1983 | Chang et al. | |
| 4,385,142 A * | 5/1983 | Bohm et al. ................... | 524/68 |
| 4,412,019 A | 10/1983 | Kraus | |
| 4,451,598 A | 5/1984 | Decroix | |
| 4,497,921 A | 2/1985 | Chang et al. | |
| 4,659,759 A | 4/1987 | Jevanoff et al. | |
| 4,719,039 A * | 1/1988 | Leonardi ....................... | 252/511 |
| 4,738,998 A | 4/1988 | Uffner et al. | |
| 4,839,404 A | 6/1989 | Chang et al. | |
| 4,872,930 A | 10/1989 | Kajikawa et al. | |
| 4,933,384 A | 6/1990 | Wolfe | |
| 4,978,698 A | 12/1990 | Woodhams | |
| 4,988,747 A | 1/1991 | Strommer | |
| 5,017,230 A | 5/1991 | Hopkins et al. | |
| 5,039,755 A | 8/1991 | Chamberlain et al. | |
| 5,070,123 A | 12/1991 | Moran | |
| 5,095,055 A | 3/1992 | Moran | |
| 5,206,275 A * | 4/1993 | Kubo et al. ................... | 524/114 |
| H1250 H | 11/1993 | Gilmore et al. | |
| 5,266,615 A | 11/1993 | Omeis et al. | |
| 5,280,064 A | 1/1994 | Hesp et al. | |
| 5,302,638 A | 4/1994 | Ho et al. | |
| 5,314,935 A | 5/1994 | Chaverot et al. | |
| 5,328,943 A | 7/1994 | Isobe et al. | |
| 5,380,773 A | 1/1995 | Bellio et al. | |
| 5,382,612 A | 1/1995 | Chaverot et al. | |
| 5,473,000 A | 12/1995 | Pinomaa | |
| 5,482,982 A | 1/1996 | Lakshmanan et al. | |
| 5,508,112 A | 4/1996 | Planche et al. | |
| 5,549,744 A | 8/1996 | Puzic et al. | |
| 5,565,510 A | 10/1996 | Giavarini et al. | |
| 5,605,946 A | 2/1997 | Planche et al. | |
| 5,708,062 A * | 1/1998 | Maillet et al. ................. | 524/68 |
| 5,756,565 A | 5/1998 | Germanaud et al. | |
| 5,773,496 A | 6/1998 | Grubba | |
| 5,795,929 A | 8/1998 | Grubba | |
| 5,840,109 A | 11/1998 | Braga et al. | |
| 5,856,386 A * | 1/1999 | Sakai et al. ................... | 524/271 |
| 6,011,094 A * | 1/2000 | Planche et al. ................ | 524/68 |
| 6,069,194 A | 5/2000 | Frazen et al. | |
| 6,087,420 A | 7/2000 | Planche et al. | |
| 6,100,317 A * | 8/2000 | Liang et al. ................... | 524/69 |
| 6,127,461 A | 10/2000 | Takamura et al. | |
| 6,284,820 B1 | 9/2001 | Braga et al. | |
| 6,348,525 B1 | 2/2002 | Takamura et al. | |
| 6,359,033 B1 | 3/2002 | Ait-Kadi et al. | |
| 6,429,241 B1 | 8/2002 | Liang | |
| 6,441,065 B1 | 8/2002 | Chevillard et al. | |

(Continued)

FOREIGN PATENT DOCUMENTS

DE 3819931 C2 10/1990

(Continued)

OTHER PUBLICATIONS

Louis T. Germinario and Terry L. Cutshall, "Aging Effects on Compatibility, Stability and Morphology of Asphalt-Polymer Blends, Part I," Petersen Asphalt Research Conference, Jul. 2002.

*Primary Examiner*—Edward J. Cain
(74) *Attorney, Agent, or Firm*—Hovey Williams L.L.P.; Kameron D. Kelly

(57) ABSTRACT

A modified asphalt composition is provided comprising at least one plastomer, at least one elastomer, at least one crosslinking agent and asphalt. More specifically, a modified asphalt composition is provided comprising an oxidized polyethylene, a styrene-butadiene-styrene block copolymer, sulfur, and asphalt. A hot mix asphalt composition is also provided comprising the modified asphalt composition and aggregate. Processes for producing the modified asphalt composition and the hot mix asphalt composition are also provided as well as articles produced from these inventive compositions.

44 Claims, No Drawings

U.S. PATENT DOCUMENTS

| | | |
|---|---|---|
| 6,486,249 B1 | 11/2002 | Dituro et al. |
| 6,569,925 B2 | 5/2003 | Baumgardner et al. |
| 6,875,808 B2 * | 4/2005 | Weier et al. ............... 524/504 |
| 2003/0032703 A1 | 2/2003 | Liang |
| 2003/0165682 A1 | 9/2003 | Menting et al. |
| 2004/0054038 A1 * | 3/2004 | Andriolo ............... 524/59 |
| 2004/0127614 A1 * | 7/2004 | Jiang et al. ............... 524/270 |

FOREIGN PATENT DOCUMENTS

| | | |
|---|---|---|
| JP | 52029621 A | 3/1977 |
| JP | 62079268 A | 10/1985 |
| JP | 6192579 A | 12/1992 |

* cited by examiner

MODIFIED ASPHALT COMPOSITIONS

FIELD OF THE INVENTION

The present invention relates to modified asphalt compositions comprising at least one plastomer, at least one elastomer, and asphalt; wherein the elastomer is optionally crosslinked with at least one crosslinking agent. More particularly, the present invention is directed to modified asphalt compositions for use in road pavement. The present invention also relates to hot mix asphalt compositions comprising at least one plastomer, at least one elastomer, asphalt, and aggregate; wherein the elastomer is optionally crosslinked with at least one crosslinking agent.

BACKGROUND OF THE INVENTION

Asphalt is a commonly used material for construction purposes, such as a road pavement or roofing material. Asphalt alone, however, often does not possess all the physical characteristics desirable for many construction purposes. For instance, unmodified asphalt may exhibit a poor Performance Grade Rating (PG Rating) as a road pavement material. As used herein, PG Rating is defined as the average seven-day maximum and the single-day minimum pavement design temperature, wherein the maximum is determined 20 mm below the surface of the pavement and the minimum is determined at the surface of the pavement. Although the PG Rating for asphalt may widely vary, asphalt generally used in road pavement applications exhibit PG Ratings of about 64-22, which indicates a 64° C. average seven day maximum and a −22° C. single day minimum pavement design temperature.

When used as a road pavement material, asphalt is typically subjected to temperatures in excess of 64° C. twenty mm below the pavement surface and below −22° C. at the pavement surface. Temperatures outside this range lead to deterioration of the asphalt pavement. Hence, it has for some time been an objective to broaden the PG Rating range of asphalt used in road pavement applications.

To broaden the PG Rating range of the asphalt pavement, modifiers are added to the asphalt. In addition to increasing the PG Rating range of the asphalt, modifiers also can improve other qualities of the asphalt, such as its toughness, flexibility and wear characteristics. Typically, modifiers are added to molten asphalt and mixed for several hours to produce a modified asphalt. Then, crosslinking agents can be added. The modified asphalt is then routed to a mixer where aggregate is added to produce the hot mix asphalt (HMA). The hot mix asphalt is then taken to the construction site for use in paving equipment.

Three major problems associated with the performance of hot mix asphalts (HMA) pavements can be moisture susceptibility (stripping), permanent deformation (rutting, bleeding and shoving) and cracking (thermal and fatigue). There are a number of modifiers that can be added to the HMA mixture that can provide a solution to each of these problems individually. Liquid anti-strips and hydrated lime are additives that can be used to reduce moisture susceptibility problems. They alter the surface chemistry at the interface between the aggregate and the asphalt resulting in an improved bonding of the asphalt and aggregate. Polymers can be used to modify an asphalt to increase the high temperature stiffness of the HMA, which can reduce the probability of rutting, bleeding and shoving. Polymers may be selected and used to impart elastomeric properties which can reduce thermal and fatigue cracking by allowing the modified asphalt to undergo repeated strains with recovery. However, it is difficult to find a modifier that will provide a solution to these problems simultaneously especially one that does not require high shear blending or modified blending procedures.

The current methods used in the United States to make an asphalt hot mix for road paving involves melting the asphalt in a large heated tank and adding 2 to 6 percent of an elastomer. Typically, high dosages of elastomer are used globally, usually a synthetic rubber such as styrene butadiene styrene block copolymer (SBS). The SBS block copolymer dissolves slowly in the asphalt due to viscosity differences when only stirring is used. Tanks equipped with high shear stirrers shorten the time to dissolve the elastomer. After the elastomer is dissolved a crosslinking agent, such as sulfur, peroxide or a transition metal can be added to crosslink the elastomer. Adding the cross-linking agent, sulfur, at the same time as the SBS block copolymer results in immediate and localized cross-linking, which may manifest itself as agglomerated SBS clumps that do not dissolve quickly or easily. These clumps can require further blending/milling. The SBS block copolymer can actually form a matrix in the asphalt. If the crosslinking agent is added too soon to the mix, before the rubber has dissolved, an intractable mass of rubber is formed which is not dissolvable. If the crosslinking agent is added late, both time and money are then wasted. Hence, the addition of the crosslinking agent is critical to the correct make up and economics of the asphalt hot mix.

The use of sulfur to crosslink rubber has been known in the industry for about a hundred years. Much research has been concerned with adjusting the speed of the crosslinking reaction. That is, the development of accelerators, crosslink modifiers and retarders has been a very lucrative and fruitful area of research for the many chemical suppliers to the vulcanization industry. However, it should be noted that all modifications to the timing of sulfur as a crosslinking agent have resulted in shorter times to affect more crosslinking. Thus, no additive is available to prolong, delay or slow down the action of the sulfur crosslinking. Sulfur by itself is as slow as sulfur can be made to crosslink at a given temperature.

Cross-linking of the hot asphalt mix is not required, but highly preferred. Without cross-linking, more elastomer and elastomer of higher molecular weight are required to achieve the same end point, adding cost to the modification package. The use of a cross-linking agents permits the use of lower molecular weight elastomers, which are inherently easier to dissolve and may be lower cost. Sulfur, if used, is actually a cost reducer since it allows less elastomer to be used to achieve the same performance properties.

The addition of the elastomer to the tank of asphalt usually involves dumping a large quantity of elastomer into the top of the mix tank. When the sulfur is added similarly, a large disagreeable cloud of dust can be formed as well as fumes from the sulfur contacting the molten asphalt. In some cases, a hazardous sulfur cloud or sulfur gases can form and resulting odor may lead to the evacuation of the area until the cloud subsides. Even the addition of chunks of sulfur can lead to dust clouds and disagreeable odor.

The process of introducing finely divided dry materials, such as sulfur, into hot reaction vessels or tanks can present a hazard due to the formation and presence of sulfur dioxide or hydrogen sulfide vapors in combination with elevated processing temperatures. In addition, finely divided dry materials often do not mix efficiently when combined with the liquid material in the system. In an attempt to remedy this problem, the finely divided dry material can be predispersed in oil. However, the tendency for the heavier finely divided material to settle requires constant agitation. More viscous oils and/or asphalt fluxes have been utilized to prevent the settlement of the finely divided material, but the use of these materials can require the application of higher processing temperatures to maintain the oil and or asphalt fluxes at a pumpable viscosity. In addition, this method can also require constant agitation to maintain dispersion of the finely divided material. As a result, the higher temperature needed in processing can increase the risks of emission of toxic gases, such as hydrogen sulfide, which is highly toxic and flammable.

Elastomers are more difficult to disperse in molten asphalt. They require the use of high shear mixing, increased processing temperatures, and long mixing times to obtain a good mix. Elastomers tend to increase the process viscosity of the asphalt. This increase in process viscosity can make the modified asphalts more difficult to mix and coat the aggregate in the mixing zone and subsequently more difficult to compact during installation of the hot mix asphalt composition. This is a technical and practical issue currently occurring in the industry. Typically, elastomers commonly used do not improve adhesion to aggregate in wet environments and can contribute to anti-stripping properties. These hot mix asphalt compositions still require the inclusion of an anti-stripping additive.

It is, therefore, apparent that there is a need for asphalt modifiers capable of modifying the physical characteristics of asphalt, as indicated by a broader PG rating. In addition, there is a need for modified asphalt compositions where the modifiers are easily dispersed in the asphalt. Furthermore, there is a need for modified asphalt compositions where there is reduction in dust and gas formation when the modifiers are added to the molten asphalt.

SUMMARY OF THE INVENTION

Surprisingly, the inventors have found modified asphalt compositions having at least one of the following improvements: broader PG rating, reduction in gas and dust formation upon addition of modifiers, improved ease of dispersion of the modifiers in the molten asphalt, and long-term storage stability and good workability.

In accordance with one embodiment of the invention, a modified asphalt composition is provided comprising at least one plastomer, at least one elastomer, and asphalt, wherein the elastomer is optionally crosslinked with at least one crosslinking agent. The asphalt composition can be used for various purposes including paving and roofing. It is particularly well suited for road paving applications.

In accordance with another embodiment of the invention, a hot mix asphalt composition is provided comprising at least one plastomer, at least one elastomer, asphalt, aggregate, and wherein the elastomer is optionally crosslinked with at least one crosslinking agent.

In accordance with another embodiment of the invention, a pellet is provided comprising at least one elastomer and at least one plastomer; wherein the pellet is used as an asphalt modifier.

In accordance with another embodiment of the invention, a pellet is provided comprising at least one plastomer and at least one crosslinking agent; wherein the pellet is used as an asphalt modifier.

In accordance with another embodiment of the invention, an article formed from the modified asphalt composition or the hot mix asphalt composition is provided. In a preferred embodiment of the present invention, the article formed from the modified asphalt composition or hot mix asphalt composition is road pavement.

In accordance with yet another embodiment of the invention, a process to produce the modified asphalt composition is provided. The process comprises contacting at least one plastomer, at least one elastomer, asphalt, and optionally at least one crosslinking agent to produce the modified asphalt composition.

In accordance with still another embodiment of the invention, a process to produce a hot mix asphalt composition is provided. The process comprises contacting at least one plastomer, at least one elastomer, asphalt, aggregate, and optionally at least one crosslinking agent to produce the hot mix asphalt composition.

These and other features, and advantages of the present invention will become more fully apparent from the following description and appended claims, or may be learned by the practice of the of the invention as set forth hereinafter.

DETAILED DESCRIPTION OF THE INVENTION

It must be noted that, as used in the specification and the appended claims, the singular forms "a," "an" and "the" include plural referents unless the context clearly dictates otherwise. Thus, for example, reference to "an asphalt" includes mixtures of two or more such asphalts, and the like.

Ranges are often expressed herein as from "about" one particular value, and/or to "about" another particular value. When such a range is expressed, another embodiment includes from the one particular value contained in the range and/or to the other particular value contained in the range. Similarly, when values are expressed as approximations, by use of the antecedent "about," it will be understood that the particular value contained in the range forms another embodiment.

The term "asphalt" is a dark brown to black cementitious material which is solid or semi-solid in consistency, comprising bitumens as its predominant constituent. Typically, asphalt is described as a black solid with a dull luster.

The term "thermal cracks" is defined as cracks resulting from internal stresses induced by temperature change and stresses exceeding the strength of the pavement. Thermal cracks typically occur at low temperatures.

The term "rutting" is defined as a form of permanent deformation, where shearing forces, such as from an automobile wheels push the asphalt layers apart resulting in ruts. Rutting generally occurs at high temperatures.

The term "fatigue cracking" is defined as crack patterns that can lead to potholes. Fatigue cracking generally occurs over a period of time and at low to moderate pavement temperatures.

It is a feature of the present invention to provide a modified asphalt composition comprising at least one plastomer, at least one elastomer, asphalt, and optionally wherein the elastomer is crosslinked with at least one crosslinking agent.

It is further a feature of the present invention to provide a plastomer and elastomer that is compatible with asphalt and which is easily dispersed in asphalt without the use of expensive mixing equipment or processes.

The elastomer, plastomer, and optionally, the crosslinking agent can be added to the asphalt in any amount necessary to obtain the properties desired by the modified asphalt composition. The amounts of course will vary depending on the characteristics of the asphalt. Preferably, the amounts added increase the PG rating of the modified asphalt composition by +1 to +3 grades.

The plastomer can be present in the modified asphalt mixture in an amount from about 0.1% by weight to about 10% by weight based on the weight of the modified asphalt composition, preferably from about 0.5% by weight to about 7% by weight, and most preferably 1% by weight to 5% by weight. The elastomer can be present in the modified asphalt composition in an amount from about 0.1% by weight to about 10% by weight based on the weight of the modified asphalt composition, preferably from about 0.5% by weight to about 7% by weight, and most preferably 1% by weight to 5% by weight. The crosslinking agent can be present in the modified asphalt composition in an amount from about 0.1% by weight to about 2% by weight based on the weight of the modified asphalt composition, preferably from about 0.5% by weight to about 2% by weight, and most preferably 0.5% to 1.5% by weight.

Alternatively, the plastomer and elastomer can be combined together to produce a plastomer/elastomer mix and then added to the asphalt. When this method is utilized, the plastomer is present in the plastomer/elastomer mix in an amount from about 0.1% by weight to 99.9% by weight, preferably from 25% by weight to 80% by weight based on the total weight of the plastomer and elastomer. The elastomer can be present in the plastomer/elastomer mix in an amount from about 0.1% by weight to 99.9% by weight, preferably from 25% by weight to 80% by weight based on the total weight of the plastomer and elastomer. Preferably, the plastomer and elastomer are extruded in an extruding zone to produce plastomer/elastomer pellets, and the plastomer/elastomer pellets are then added to the asphalt. The extruding zone comprises at least one extruder.

In another embodiment, the plastomer and the crosslinking agent are extruded in an extruding zone to produce plastomer/crosslinking agent pellets, and the plastomer/crosslinking agent pellets are then added to the asphalt. The amount of crosslinking agent in the plastomer/crosslinking agent pellets range from about 0.1% by weight to about 5% by weight, preferably 1% by weight to 3% by weight based on the weight of the elastomer.

The asphalt used in the present invention may be any asphalt known in the art. Preferably, the asphalt utilized in this invention is any that is conventionally used in road paving applications. Such asphalt may be obtained from different sources, such as naturally occurring asphalt, vacuum distillation residue, or hydrocarbon cracking residue. The use of asphalt derived as a residue from vacuum distillation is preferred. Asphalt may be further described by using its penetration value ("PEN"), asphalt cement viscosity value ("AC"), or asphalt aged residue viscosity ("AR"). The measurement of PEN values is defined by ASTM D5. Asphalt, as used herein, can have a PEN value of from about 40 to about 300 dmm. The measurement of AC viscosity values is defined by ASTM D2171. Asphalt, as used herein, can have an AC value of from about 2.5 to about 40 hundreds of poises. The measurement of AR values is defined by ASTM D2171. Asphalt, as used herein, can have an AR value of from about 1,000 to about 16,000 poises.

The asphalt used in the present invention may be unmodified or modified asphalt. In some applications, oxidized asphalt provides different weather resistance and stability characteristics. The asphalt can be oxidized by any means known in the art, including mixing the asphalt with air and heating to between about 179° C. and about 260° C. with or without a catalyst. When no catalyst is used, it typically takes between four to six hours to oxidize the asphalt. With a catalyst, the processing time is shortened to between about two and about four hours. A preferred catalyst is ferric chloride ($FeCl_3$).

In a preferred embodiment, the asphalt is an AC-20 type asphalt, one commonly known as West Texas Intermediate which is commercially available from Ashland (ASHLAND AC-20).

The plastomer used in the present invention is any plastomer known in the art having a density from about 0.92 g/cm$^3$ to about 1.1 g/cm$^3$ at 25° C. as measured by ASTM D-1505. The plastomer can be at least one homopolymer or a copolymer having at least one polar functional group and having a density from about 0.92 to about 1.1 g/cm$^3$ at 25° C. The plastomer is preferably selected from oxidized polyolefins, maleated polyolefins and acrylic acid grafted polyolefins. More preferably, the plastomer is selected from maleated polyethylene, maleated polypropylene, oxidized polyethylene, acrylic acid grafted polyethylene, acrylic acid grafted polypropylene and mixtures and derivatives thereof. Most preferably, the plastomer is an oxidized polyethylene.

In one embodiment of the present invention, the plastomer can have properties in at least one of the following ranges: an acid number from about 0.1 to about 50 as measured by ASTM D-1386, a needle penetration hardness less than about 50 dmm at 25° C. measured by ASTM D-1321, and a viscosity from about 1 to about 100,000 cP at 135° C., as measured by D-1824.

In a preferred embodiment, the plastomer is an oxidized polyethylene homopolymer having at least one of the following properties: a density from about 0.92 to about 1.1 g/cm$^3$, a hardness less than about 1.5 dmm at 25° C., an acid number from about 5 to about 41, and a viscosity from about 800 to about 8,000 cP at 125° C. Suitable plastomers are commercially available from Eastman Chemical Company under the tradename Epolene.

The elastomer is any synthetic rubber compound known in the art. Generally, synthetic rubbers are produced from monomers obtained from the cracking and refining of petroleum. Suitable monomers for the production of synthetic rubbers include, but are not limited to, styrene, butadiene, carboxylated butadiene, isobutylene, isoprene, carboxylated isoprene, chloroprene, ethylene, propylene, acrylonitrile, and mixtures thereof.

In one embodiment, the elastomer is a block copolymer of at least one conjugated diene and at least one monoalkenyl aromatic hydrocarbon. The preferred conjugated dienes are butadiene, isoprene, chloroprene, carboxylated butadiene, and carboxylated isoprene. Most preferably, the conjugated diene is butadiene or isoprene. The preferred monoalkyenyl aromatic hydrocarbon is styrene. Such block copolymers can have a general formula A-B-A or (A-B)$_n$X wherein each A block is a monoalkyenyl aromatic hydrocarbon polymer block, each B block is a conjugated diolefin polymer block, X is a coupling agent and n is an integer from 2 to about 30. Such block copolymers can be linear or may have a radial or star configuration as well as being tapered. Block copolymers such as these are well known and are described in U.S. Pat. Nos. 4,145,298; 4,238,202; and 5,039,755; all of which are incorporated by reference. The block copolymers can have a number average molecular weight from abut 30,000 to about 300,000, as measured by ASTM D-5296.

When the conjugated diene is butadiene and the monoalkyenyl aromatic hydrocarbon is styrene, the amount of styrene repeating units ranges from about 15% by weight to about 50% by weight based on the weight of the block copolymer, preferably from about 17% by weight to 35% by weight, most preferably from 20% by weight to 31% by weight with the remainder being repeating units-derived from butadiene. Styrene-butadiene block copolymers can have a number average molecular weight ranging from about 50,000 to about 200,000, preferably from 80,000 to 180,000.

The block copolymer can employ a minimal amount of hydrocarbon solvent in order to facilitate handling. Examples of suitable solvents include plasticizer solvent that is a non-volatile aromatic oil.

In another embodiment of this invention, a modified asphalt composition is provided comprising at least one plastomer, at least one elastomer, and asphalt, wherein the elastomer is crosslinked with at least one crosslinking agent.

The crosslinking agent can be any that is known in the art capable of crosslinking with the elastomer. For example, crosslinking agents for asphalt are disclosed in U.S. Pat. Nos. 5,017,230; 5,756,565, 5,795,929, and 5,605,946; all of which are hereby incorporated by reference.

In one embodiment of the present invention, the crosslinking agent is at least one selected from elemental sulfur, hydrocarbyl polysulfides, peroxides, and transition metals. The elemental sulfur capable of being employed to constitute, partially or wholly, the crosslinking agent can be flowers of sulfur and sulfur crystallized in the orthorhombic form, known by the name of alpha sulfur.

The hydrocarbyl polysulfides capable of being employed to form at least a portion of the crosslinking agent correspond to the general formula:

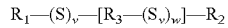

$$R_1—(S)_v—[R_3—(S_v)_w]—R_2$$

wherein each of $R_1$ and $R_2$ denotes a saturated or unsaturated, monovalent $C_1$–$C_{20}$ hydrocarbon radical or $R_1$ and $R_2$ are joined together to form a saturated or unsaturated, divalent $C_2$–$C_{20}$ hydrocarbon radical forming a ring with the other groups of atoms which are associated in the formula. $R_3$ is a saturated or unsaturated, divalent $C_1$–$C_{20}$ hydrocarbon radical. The —$(S)_v$— groups denote divalent groups each made up of v sulfur atoms. It is possible that the number of sulfur atoms, v, for each of these groups can differ. The number of sulfur atoms, v, denote integers ranging from about 1 to about 6. Preferably, at least one of the —$(S)_v$— groups has at least two or greater sulfur atoms. In the group —$[R_3—(S_v)_w]$—, w denotes an integer having values from 0 to about 10.

In the abovementioned formula, the monovalent $C_1$–$C_{20}$ hydrocarbon radicals, $R_1$ and $R_2$ and the divalent $C_1$–$C_{20}$ hydrocarbon radical, $R_3$, are chosen especially from aliphatic, alicyclic, or aromatic radicals. When the radicals $R_1$ and $R_2$ are joined together to constitute a divalent $C_1$–$C_{20}$ hydrocarbon radical forming a ring with the other groups of atoms associated in the formula, the divalent radical can be similar to the radical $R_3$ and may also be of the aliphatic, alicyclic or aromatic type. Preferably, $R_1$ and $R_2$ are identical and chosen from $C_1$ to $C_{20}$ alkyl radicals, such as, but not limited to, ethyl, propyl, hexyl, octyl, nonyl, decyl, linear dodecyl, tert-dodecyl, hexadecyl, octadecyl, and $C_6$–$C_{20}$ cycloalkene or arylene radicals, especially phenylene, toluene, and cyclohexane.

Examples of polysulfides include, but are not limited to, dihexyl disulfide, dioctyl disulfide, didodecyl disulfide, di-tert-dodecyl disulfide, dihexadecyl disulfide, dihexyl trisulfide, dioctyl trisulfide, dinonyl trisulfide, di-tert-dodecyl trisulfide, dinonyl trisulfide, di-tert-dodecyl trisulfide, dihexadecyl trisulfide, dihexyl tetrasulfide, dioctyl tetrasulfide, dihexadecyl tetrasulfide, dioctyl tetrasulfide, dinonyl tetrasulfide, di-tert-dodecyl tetrasulfide, dihexadecyl tetrasulfide, dihexyl pentasulfide, dioctyl pentasulfide, dinonyl pentasulfide, di-tert-dodecyl pentasulfide, dihexadecyl pentasulfide, diphenyl trisulfide, dibenzyl trisulfide, diphenyl tetrasulfide, ortho-tolyl tetrasulfide, dibenzyl tetrasulfide, dibenzyl pentasulfide, diallyl pentasulfide, tetramethyltetrathiane, and mixtures thereof.

Any peroxide known in the art capable of crosslinking with the elastomer of this invention can be utilized. Examples of such peroxides include, but are not limited to, hydroperoxides, dialkyl peroxides, peroxydicarbonates, diacyl peroxides, peroxyesters, and others.

Any transition metal compound known in the art capable of crosslinking with the elastomer of this invention can be utilized. Examples of such transition metal compounds include, but are not limited to, zinc compounds, such as, zinc oxide; nickel compounds, such as nickel(II) chloride; and titanium compounds, such as, titanium halides and titanium hydroxides. Other active metal compounds known to react with unsaturation can be used.

Although not necessary in this invention, if desired, crosslinking accelerators can be utilized. Crosslinking accelerators are disclosed in U.S. Pat. No. 5,314,935, which is herein incorporated by reference beginning in column 7, line 5 through column 8, line 58.

The modified asphalt composition can also comprise other additives known to those skilled in the art. Additives include nitrogen compounds of amine or amide which are used as promoters of adhesion for the asphalt and the elastomer.

The modified asphalt compositions can be used to form any suitable articles. More particularly, the modified asphalt compositions are used to form road pavement surfaces. To form a road pavement, the modified asphalt composition is applied to a surface, such as earth that has preferably been leveled, using any method, including any method commonly used in the road paving industry. While the modified asphalt composition provides excellent physical characteristics for road paving applications, these mixtures may also be used for other construction purposes, such as roofing applications.

In another embodiment of this invention, a process is provided to produce the modified asphalt composition. The process comprises contacting at least one plastomer, at least one elastomer, asphalt, and optionally at least one crosslinking agent. The contacting can be conducted by any method known in the art. Generally, the asphalt is heated to its molten state and the plastomer, elastomer, and optionally the crosslinking agent are then added and mixed into the asphalt to produce the modified asphalt composition. Preferably, the plastomer and elastomer are added simultaneously. Most preferably, the elastomer, plastomer, and crosslinking agent are added simultaneously.

In another embodiment of this invention, a process for producing a hot mix asphalt composition is provided. The process comprises contacting at least one plastomer, at least one elastomer, asphalt, aggregate, and optionally at least one crosslinking agent.

The term "aggregate" is a collective term denoting any mixture of such materials including, but not limited to, sand, gravel, and crushed stone, and the like used with asphalt. The type of aggregate and the amounts used vary depending on the use of the hot mix asphalt composition.

In yet another embodiment, a process for producing a modified asphalt composition is provided. The process comprises: 1) contacting at least one plastomer and at least one elastomer in an extruder zone to produce a plastomer/elastomer pellet; 2) adding the plastomer/elastomer pellet and optionally at least one crosslinking agent to at least one molten asphalt to produce a modified asphalt mixture; and e) mixing the modified asphalt mixture in a mixing zone to distribute the plastomer, elastomer, and optionally the crosslinking agent to produce the modified asphalt composition. Preferably, the plastomer/elastomer pellet and crosslinking agent are added simultaneously.

In still another embodiment of this invention, a process for producing a modified asphalt composition is provided. The process comprises: 1) contacting at least one plastomer and at least one elastomer in an extruder zone to produce a plastomer/elastomer pellet; 2) contacting at least one plastomer and at least one crosslinking agent in an extruder zone to produce a plastomer/crosslinker pellet; 3) adding the plastomer/elastomer pellet and the plastomer/crosslinker pellet to at least one molten asphalt in a mixing zone to produce a polymer modified asphalt mixture; and 4) mixing the modified asphalt mixture in the mixing zone to distribute the plastomer, elastomer, and crosslinking agent to produce the modified asphalt composition. Preferably, the plastomer/elastomer pellet and the plastomer/crosslinker pellet are added simultaneously.

The extruder zone comprises at least one extruder. The plastomer and elastomer are heated in the extruder zone to a sufficient temperature so they can be adequately mixed.

The mixing zone comprises any equipment suitable for mixing the asphalt, plastomer, elastomer, and optionally the crosslinking agent. Suitable equipment includes, but are not limited to, low shear mixing equipment and high shear mixing equipment.

By adding the plastomer, elastomer, and crosslinking agent in pellet form to the molten asphalt, dust and fumes can be significantly reduced.

An advantage of the use of the plastomer is that when the polymers are added to asphalt, the viscosity of the mixture is only slightly increased over the viscosity of asphalt alone. By increasing the viscosity only slightly, the mixture exhibits good hot-mix workability and no observable separation. This aids also in the mixing of the elastomer, which is typically very difficult to mix. Furthermore, the plastomers exhibit dispersibility with a large number of asphalts, resulting in mixtures that are storage stable, with no polymer phase separation.

The present invention will be more readily understood by reference to the following examples. There are, of course, many other forms of the invention which will become obvious to one skilled in the art, once the invention has been fully disclosed, and it will accordingly be recognized that these examples are given for the purpose of illustration only and are not to be construed as limiting the scope of the invention in any way.

EXAMPLES

Table 1 lists the test methods used to characterize the modified asphalt compositions of the examples.

TABLE I

| Test Name | Test Method |
| --- | --- |
| Performance Graded Asphalt Binders | AASHTO MP1 |
| Kinematic Viscosity 135° C. | ASTM D 2170 |
| Absolute Viscosity 60° C. | ASTM D2171 |
| Toughness and Tenacity | ASTM D 5801 |
| Ring and Ball Softening Point | ASTM D-36 |
| Dynamic Shear Rheometer (DSR) | AASHTO TP5 |
| Penetration | ASTM D 5 |
| Compatibility/Separation | ASTM D 5976 |

TABLE I-continued

| Test Name | Test Method |
| --- | --- |
| Elastic Recovery | ASTM D 6084 |
| Rolling Thin Film Oven Test (RTFO) | ASTM D 2872 |
| Pressure Aging Vessel | ASTM D 6521 |
| Bending Beam Rheometer (BBR) | ASTM D 6648 |
| Force Ratio | AASHTO T-300 |

One criterion for asphalt performance is the Superpave™ Performance Graded (PG) Binder Specification. These parameters, which indicate the visco-elastic and service performance related properties of asphalt compositions, were developed to classify materials based upon performance. The PG parameters measure the properties between the low temperature service rating for the material (generally based upon embrittlement cracking) and the high temperature service properties for the material (generally based upon heat softening) to determine a service temperature range. The greater the PG temperature range rating, the greater the service range for the material.

Another criterion to evaluate asphalt performance is a group of historical conventional protocols such as Softening Point, Penetration, Force Ratio, Elastic Recovery, Compatibility, Toughness, and Tenacity. These tests assess a variety of physical properties that through historical use and correlation to actual pavement performance are used to specify an asphalt by various agencies in addition to the Superpave criteria.

Inventive Examples 1–6, 8–14 and 16 and Comparative Examples 7 and 15 in Tables 2 and 3, a PG 64-22 asphalt was modified. The PG 64-22 was heated to about 370–380° F. to produce a molten asphalt. The Preblend Additives 1 and 2 and the Crosslinker Preblend Additive were added in pellet form to the molten asphalt, and these additives were blended into the asphalt at high shear for about 1 hour followed by paddle agitation (stirring) for two hours at 370–380° F. This procedure was necessary to adequately blend the SBS block copolymer into the asphalt in Comparative Examples 7 and 15 and Inventive Examples 8 and 16. As can be seen from the data, this 3 hour period of mixing is not necessary when adding preblended elastomer and plastomer at the same time.

Preblend Additive 1 in Table 2 consisted of a 50/50 by weight blend of Wingflex® 411 SBS block copolymer commercially available from Goodyear and oxidized polyethylene available commercially as Epolene® E-20 wax from Eastman Chemical Company. Comparative Example 7 and Inventive Example 8 utilized Kraton® D1184 SBS block copolymer. The Crosslinker Preblend Additive 1 in Table 2 and Table 3 is 25% by weight sulfur in Epolene® E-20 oxidized polyethylene.

Preblend Additive 2 in Table 3 consisted of a 25/75 by weight blend of Wingflex® 400 SBS block copolymer commercially available from Goodyear and oxidized polyethylene available commercially as Epolene® E-20 wax from Eastman Chemical Company. Comparative Example 15 and Inventive Example 16 utilized Kraton® D1184 SBS block copolymer.

The PG Rating and conventional data displayed in Tables 2 and 3 indicates the inventive modified asphalt compositions have comparable performance grades and equivalent or improved conventional properties as compared to that of an asphalt containing a similar concentration of elastomer (e.g. SBS block copolymer).

The presence of the plastomer allows a more efficient use of the elastomer in the asphalt to achieve improved properties without detrimental effects such as incompatibility and high process viscosities associated with elastomer usage at equivalent dosages.

Comparative Examples 7 and 8

In Examples 7 and 8, modification of the PG 64-22 asphalt with 4% Kraton® D 1184 SBS block copolymer increased the PG grade by 2 grades to a PG 76-22 grade. In Example 8, the addition of a small amount of crosslinking agent only slightly increased the performance grade of the modified asphalt. However, the Crosslinker Preblend Additive 1 (Example 8) was not added with the Kraton® SBS rubber, but was added after the rubber had dissolved. It took the full three hours for the Kraton® SBS rubber to disperse in the PG 64-22 asphalt. It was only after the Kraton® SBS rubber had dispersed that the Crosslinker Preblend Additive 1 (oxidized polyethylene and sulfur) was added.

Example 7 shows that 4% Kraton® SBS rubber was not very compatible with asphalt in that the softening point after 48 hours at 163° F. was very different at the top (198° F.) and at the bottom (138° F.) of the aged sample. This was not the case for the inventive examples. This is a common problem with elastomer use and most host asphalts. Incompatibility, also referred to as separation, can typically be caused by a compositional deficiency in the asphalt for elastomer modification. When separation occurs, the 'dissolved' polymer phase can separate and rise to the surface of the blend and the asphalt's higher molecular weight component fractions, asphaltenes, can precipitate from the asphalt matrix and sink to the bottom of the blend. This often results in process difficulties at a modified asphalt producing facility. This can be followed by process problems at the hot asphalt mix manufacturing facility, and if incorporated into the pavement structure, pavements that under perform. Compatibility is a key property and is incorporated in nearly all specifications involving asphalt modifiers world wide.

Inventive Examples 1–6 and 9–14

Inventive Examples 1–6 of Table 2 and 9–14 of Table 3 depict the benefits of modification of asphalt with PreBlend Additives 1 and 2, which are further enhanced by co-use of Crosslinking Preblend Agent 1. These examples, inclusive, displayed separation values of <2° F., as determined by the Ring and Ball Softening Point. It should be noted the addition of Preblend Additives 1 and 2 in pellet form had a significant improved effect on separation, which may not be realized if the components of the Preblend Additives (oxidized polyethylene and SBS block copolymer) were added separately. When an asphalt and additive system are prone to separation, the asphalt may be remedied through the use of ancillary technologies such as aromatic oil addition, source asphalt blending, use of lower viscosity asphalt, which requires more elastomer to achieve the desired high temperature requirements. All of these processes are costly and time consuming.

Inventive Examples 3 and 5 of Table 1 indicate the benefit of inclusion of the proper dosage of Crosslinking Preblend Agent 1 with Preblend Additive 1 on Toughness and Tenacity, a measure of the strength under strain of the modified asphalt. These data are compared with Inventive Examples 1 and 2 where sulfur was not used for crosslinking. Toughness and Tenacity is a parameter used by various State DOTs in their modified asphalt specifications to assure the correct type and proper quantity of elastomer is used to meet the modified asphalt's specified requirements.

Similar improvements are witnessed in the Elastic Recovery properties of Inventive Examples 3 and 5. The elastic recovery (%) ranged from 66–83 for the examples involving crosslinking, while Examples 1 and 2 had a elastic recovery ranging from 41–44.

Inventive Examples 1–6 and 9–14 of Tables 2 and 3 display substantially reduced process viscosities when compared to Comparative Examples 7 and 15 using Kraton® D 1184 alone as a modifier. When using Preblend Additive 1 containing a 50/50 blend of SBS block copolymer and oxidized polyethylene, the viscosities (centistokes) at 135° C. for inventive examples 1–6 ranged from 648 to 1,150 centistokes compared to comparative example 7 where the viscosity was 1,256 centistokes. When using Preblend Additive 2 containing a 25/75 blend of SBS block copolymer and oxidized polyethylene, the viscosity of the Inventive Examples 9–14 ranged from 540 to 802 centistokes, while Comparative Example 15 using only SBS block copolymer as a modifier had a viscosity of 988 centistokes. High process viscosities present problems to the contractor during mixing of the modified asphalt composition with the aggregates and subsequent compaction of the modified asphalt composition with aggregate.

Inventive Examples 2 and 5

Examples 2 and 5 in Table 1 correspond to the Comparative Example 7 and Inventive Example 8 in that each contains 96% asphalt. Example 8 is an inventive example, but is used here for comparative purposes to show the advantage of addition of the elastomer in a pellet with the oxidized polyethylene. In addition, Inventive Example 5 and Comparative Example 7 both contain 0.5% of Crosslinker Preblend Additive 1. Both of the inventive modified asphalt compositions upgraded the asphalt to the same PG 76-22 grade as the Comparative Example 7 and Inventive Example 8, but at half of the SBS block copolymer level as the comparative modified asphalt compositions. In addition, in Inventive Example 5, the Preblend Additive 1 in pellet form and the Crosslinker Preblend Additive in pellet form were added at the same time as a single blend of pellets. These additives had completely dispersed into the asphalt in 1.5 hours which was approximately one half of the time it took the Kraton® SBS block copolymer to disperse. The compatibility of the modified asphalt composition was greatly improved when the inventive additives were used. The Ring and Ball softening point differential on the aged samples after 48 hours at 163° F. was only 1 or 2 degrees. Thus, the combination of a plastomer with the elastomer allowed a much more efficient usage of the elastomer in the asphalt matrix which resulted in the same degree of reinforcement of the asphalt but at half the level of elastomer.

Inventive Example 6

The asphalt was modified by simultaneously adding 4% by weight Preblend Additive 1 and 1% by weight Crosslinker Preblend Additive 1 with the weight percent based on the weight of the modified asphalt composition at 370–380° F. and stirring for 1.5 hours. As shown in Table 2, the asphalt PG grade increased by +3 grades to PG 82-22 without the loss of low temperature properties.

TABLE 2

Data for examples 1 to 8

| Ingredient | Specification | I-1 | I-2 | I-3 | I-4 | I-5 | I-6 | C-7 | I-8 |
|---|---|---|---|---|---|---|---|---|---|
| | | | | | Weight Percent | | | | |
| Asphalt, West Coast Blend PG 64-22, | | 97 | 96 | 97 | 97 | 96 | 96 | 96 | 96 |
| Preblend Additive 1 | | 3 | 4 | 3 | 3 | 4 | 4 | — | — |
| Crosslinker Preblend Additive 1 | | 0 | 0 | 0.5 | 1 | 0.5 | 1 | 0 | 0.5 |
| Kraton ® D 1184 SBS | | — | — | — | — | — | — | 4 | 4 |
| | | | | PROPERTIES: Original Blend | | | | | |
| Viscosity @ 135° C., cSt | 3,000 max. | 648 | 709 | 721 | 928 | 890 | 1,150 | 1,256 | 1,574 |
| Viscosity @ 60° C. P | | 6,920 | 10,046 | 13,409 | 19,010 | 33,518 | 54,703 | 20,164 | 29,805 |
| DSR @ 88° C. kPa (G*/sin d) | 1.0 min. | — | — | — | — | — | 0.687 | — | — |
| DSR @ 82° C., kPa (G*/sin d) | | — | 0.621 | — | 0.986 | 0.829 | 1.117 | 0.764 | 0.932 |
| DSR @ 76° C., kPa (G*/sin d) | | 0.935 | 1.071 | 0.976 | 1.657 | 1.361 | 1.826 | 1.286 | 1.519 |
| DSR @ 70° C., kPa (G*/sin d) | | 1.716 | 1.777 | 1.655 | 2.823 | 2.25 | 2.768 | 2.34 | 2.729 |
| Penetration @ °25 C. dmm | | 46 | 45 | 42 | 38 | 43 | 40 | 44 | 41 |
| Softening Point, ° F. | | 134.3 | 137.3 | 151 | 162.5 | 170 | 184 | 153.5 | 164.5 |
| Force Ratio @ °4 C., f2/f1 (0.55 cm/min, 24 cm) | 0.30 min. | 0.175 | 0.194 | 0.252 | 0.147 | 0.337 | 0.283 | 0.25 | 0.418 |
| | | | | Toughness & Tenacity @ 25° C. | | | | | |
| Toughness, in-lbs. | 110 min. | 117.8 | 140.8 | 190.3 | 135.6 | 232.3 | 164 | 199.3 | 233.8 |
| Tenacity, in-lbs. | 75 min. | 53 | 68.7 | 116.8 | 49.2 | 168 | 97.7 | 128.9 | 172 |
| | | | | | | Compatibility @ 163° C./48 hrs | | | |
| Top 1/ Softening Point, ° F. | | 136.5 | 143 | 142.5 | 155 | 164 | 178 | 198 | 167 |
| Bottom 1/ Softening Point, ° F. | | 136 | 144 | 143 | 157 | 166 | 180.8 | 138 | 170 |
| Difference, ° F. | 4.0 max | 0.5 | 1 | 0.5 | 2 | 2 | 2.8 | 60 | 3 |
| Elastic Recovery, % @ 25° C. | 60 min. | 41 | 44 | 74 | 66 | 83 | 82 | 82 | 90 |
| | | | | RTFOT Residue | | | | | |
| Mass Loss, % | 0.5 max. | 0.229 | 0.229 | 0.199 | 0.142 | 0.144 | 0.114 | 0.171 | 0.142 |
| DSR @ 88° C. kPa (G*/sin d) | 2.2 min. | — | — | — | — | — | 1.245 | — | — |
| DSR @ 82° C. kPa (G*/sin d) | | — | — | — | 1.488 | 1.371 | 2.289 | 1.341 | 1.547 |
| DSR @ 76° C. kPa (G*/sin d) | | 1.508 | 2.061 | 1.577 | 2.639 | 2.323 | 3.854 | 2.598 | 2.623 |
| DSR @ 70° C. kPa (G*/sin d) | | 2.592 | 3.851 | 2.904 | 4.847 | 4.287 | 6.05 | 5.01 | 4.798 |
| Elastic Recovery, % @ 25° C. | 50 min. | 54 | 57 | 63 | 53 | 70 | 70 | 73 | 84 |
| | | | | PAV Residue (100 C., 300 psi, 20 hours) | | | | | |
| DSR @ 28° C., G*.sin d, kPa | 5,000 | 3,923 | 4,023 | 3,458 | 3,972 | 4,896 | 3,500 | 3,597 | 3,973 |
| DSR @ 25° C., G*.sin d, kPa | max. | 5,677 | 5,733 | 5,107 | 5,595 | 6,929 | 5,016 | 5,150 | 5,684 |
| BBR @ −12° C., Stiffness, MPa | 300 max. | 231 | 233 | 198 | 240 | 216 | 229 | 210 | 192 |
| m Value | 0.300 min. | 0.308 | 0.306 | 0.318 | 0.308 | 0.328 | 0.317 | 0.307 | 0.331 |
| BBR @ −18° C., Stiffness, MPa | 300 max. | 441 | 457 | 415 | 485 | 419 | 421 | 401 | 374 |
| m Value | 0.300 min. | 0.235 | 0.235 | 0.242 | 0.235 | 0.251 | 0.244 | 0.236 | 0.256 |
| Performance Grade | | 70-22 | 76-22 | 70-22 | 76-22 | 76-22 | 82-22 | 76-22 | 76-22 |
| "True" Performance Grade | | 75-22 | 76-22 | 75-23 | 81-22 | 80-24 | 83-23 | 79-22 | 81-24 |
| Effective Temperature Range, ° C. | MP 1 | 97 | 98 | 98 | 103 | 104 | 106 | 101 | 105 |
| Grade Change | | +1 | +2 | +1 | +2 | +2 | +3 | +2 | +2 |

Note:
I-1 through I-6 and I-8 are inventive examples.
C-7 is a comparative example.

Inventive Examples 9–14, and 16

In Inventive examples 9–14 and 16 and Comparative Example 15 of Table 3, a PG 64-22 asphalt was modified by blending the components at high shear for 1 hour followed by paddle agitation (stirring) for two hours at 370–380° F. The procedure was necessary to adequately blend the SBS block copolymer into the asphalt in example numbers 15 and 16. Preblend Additive 1 in Table 3 consisted of a 25/75 blend of Wingflex® 400 SBS block copolymer (Goodyear) and Epolene® E-20 oxidized polyethylene from Eastman Chemical Company. The Comparative Example 15 and Inventive Example 16 utilized Kraton® D1184 SBS rubber. The Crosslinker Additive 1 in Table 3 is 25% sulfur in Epolene® E-20 oxidized polyethylene.

Inventive Example 9 and Comparative Example 15 both have 3% by weight modifier added to the asphalt. It is expected that Comparative Example 15 would have greater toughness and tenacity than Inventive Example 9 since it contains 3 times the quantity of elastomer. The Preblend Additive 2 contained a 25/75 blend of SBS block copolymer and oxidized polyethylene. It is not expected, however, that both modified asphalt compositions containing 3% modifier would have almost the exact PG grade for the modified asphalt composition. As shown in Table 3, the "True" Performance Grade for Inventive Example 9 was 74-21 compared to 75-22 for Comparative Example 15. These two examples suggest that the elastomer and plastomer combination allows much more effective use of the elastomer to upgrade the asphalt. The plastomer facilitates the dispersal and ordering of the asphalt matrix to more readily take advantage of the elastomeric properties imparted to the modified asphalt composition.

Inventive Examples 12 and 13 show that at either higher preblend additive levels or higher crosslinker preblend agent levels further improvement, as evidenced by a higher PG grade of the modified asphalt composition, is possible. However, SBS block copolymers tend to begin to have compatibility issues at these higher loadings

| Ingredients | Spec. | I-9 | I-10 | I-11 | I-12 | I-13 | I-14 | C-15 | I-16 |
|---|---|---|---|---|---|---|---|---|---|
| | | | | | Weight Percent | | | | |
| Asphalt, West Coast Blend PG 64-22 | | 97 | 96 | 97 | 97 | 96 | 96 | 97 | 97 |
| Preblend Additive 2 | | 3 | 4 | 3 | 3 | 4 | 4 | — | — |
| Crosslinker Preblend Additive 1 | | — | — | 0.5 | 1 | 0.5 | 1 | — | 0.5 |
| Kraton ® D 1184 SBS | | — | — | — | — | — | — | 3 | 3 |
| *PROPERTIES:* | | | | | | | | | |
| Original Blend | | | | | | | | | |
| Viscosity @ 135° C. cSt | 3,000 max. | 540 | 548 | 609 | 619 | 660 | 802 | 988 | 1,037 |
| Viscosity @ 60° C. P | | 7,027 | 10,596 | 10,083 | 11,048 | 24,556 | 27,005 | 6,225 | 19,905 |
| DSR @ 88° C. kPa (G*/sin d) | | — | — | — | — | 0.441 | 0.755 | — | — |
| DSR @ 82° C. kPa (G*/sin d) | | — | 0.725 | — | 0.866 | 1.003 | 1.378 | — | 0.677 |
| DSR @ 76° C. kPa (G*/sin d) | | 0.845 | 1.159 | 0.983 | 1.449 | 1.757 | 2.113 | 0.946 | 1.125 |
| DSR @ 70° C. kPa (G*/sin d) | 1.0 kPa | 1.528 | 1.993 | 1.85 | 1.827 | — | 3.357 | 1.746 | 1.937 |
| Penetration @ 25° C., dmm | | 47.3 | 45.3 | 44.5 | 44.1 | 36 | 38 | 44 | 43 |
| Softening Point, ° C. | | 134.5 | 143 | 140 | 143.5 | 160.3 | 170 | 132 | 148 |
| Force Ratio @ 4 C., f2/f1 (5 cm/min, 24 cm) | 0.300 min | 0.113 | 0.13 | 0.106 | Broke | 0.145 | Broke | 0.223 | 0.375 |
| *Toughness & Tenacity @ 25° C.* | | | | | | | | | |
| Toughness, in-lbs. | 110 min. | 90.84 | 93.48 | 93.81 | 84.26 | 110.1 | 95.85 | 183.8 | 265.1 |
| Tenacity, in-lbs. | 75 min. | 26.11 | 29.29 | 27.04 | 15.33 | 35.26 | 17.85 | 102.29 | 191.5 |
| Compatibility @ 163 C./48 hrs | | | | | | | | | |
| Top ⅓ Softening Point, ° F. | | 137 | 147 | 140 | 144.5 | 152.5 | 161 | 136 | 155.5 |
| Bottom ⅓ Softening Point, ° F. | | 136 | 147 | 140 | 144.5 | 152.5 | 161.8 | 135 | 155.8 |
| Difference, ° F. | 4.0 max | 1.0 | 0.0 | 0.0 | 0.0 | 0.0 | 0.8 | 1.0 | 0.3 |
| Elastic Recovery, % @ 25 C. | 60 min. | 33.5 | 41 | 47.3 | 29.2 | 57 | 43 | 47.3 | 80.5 |
| *RTFOT Residue* | | | | | | | | | |
| Mass Loss, % | 0.5 max. | 0.057 | 0.086 | 0.057 | 0.085 | 0.072 | 0.086 | 0.076 | 0.056 |
| DSR @ 82° C. kPa (G*/sin d) | | — | 1.332 | — | 1.418 | 1.347 | 1.482 | — | — |
| DSR @ 76° C. kPa (G*/sin d) | | 1.601 | 2.415 | 2.054 | 2.517 | 2.576 | 2.175 | 1.919 | 1.901 |
| DSR @ 70° C. kPa (G*/sin d) | 2.2 min. | 3.23 | 4.47 | 3.749 | 3.32 | — | 4.48 | 3.856 | 3.53 |
| Elastic Recovery, | 50 min. | 41.5 | 47.8 | 43.8 | 32 | 51 | 36 | 66 | 77 |

-continued

|  |  | \multicolumn{8}{c}{Example #} |
|---|---|---|---|---|---|---|---|---|
| Ingredients |  | I-9 | I-10 | I-11 | I-12 | I-13 | I-14 | C-15 | I-16 |
|  |  | \multicolumn{8}{c}{Weight Percent} |
| % @ 25° C. |  |  |  |  |  | \multicolumn{4}{c}{PAV Residue (100 C., 300 psi, 20 hrs)} |
| DSR @ 31° C., G*.sin d, kPa |  | 3,195 | 3,024 | 3,153 | 3,167 | 3,190 | 2,912 | 2,634 | 2,074 |
| DSR @ 28° C., G*.sin d, kpa |  | 4,447 | 4,392 | 4,661 | 4,605 | 4,598 | 4,214 | 3,817 | 3,104 |
| DSR @ 25° C., G*.sin d, kPa | 5,000 max. | 5,983 | 6,260 | 6,562 | 6,504 | 6,492 | 5,946 | 5,554 | 4,509 |
| BBR @ -06° C. Stiffness MPa | 300 max. | 117 | 124 | 117 | 128 | — | — | — | — |
| m Value | 0.300 min. | 0.344 | 0.345 | 0.343 | 0.344 | — | — | — | — |
| BBR @ -12° C. Stiffness MPa | 300 max. | 260 | 272 | 254 | 274 | 249 | 244 | 211 | 188 |
| m Value | 0.300 min. | 0.298 | 0.297 | 0.302 | 0.304 | 0.301 | 0.301 | 0.309 | 0.332 |
| BBR @ -18° C. Stiffness MPa | 300 max. | — | — | 413 | 464 | 413 | 423 | 386 | 381 |
| m Value | 0.300 min | — | — | 0.244 | 0.245 | 0.246 | 0.246 | 0.248 | 0.266 |
| Performance Grade |  | 70-16 | 76-16 | 70-22 | 76-22 | 76-22 | 70-22 | 70-22 | 70-22 |
| "True" Performance Grade | M 320 | 74-21 | 78-21 | 75-22 | 80-22 | 82-22 | 84-22 | 75-22 | 74-24 |
| Effective Temperature Range, ° C. |  | 95 | 99 | 97 | 101 | 104 | 106 | 97 | 101 |

Blending Improvements of Inventive Modified Asphalt Compositions

Table 5 is a mixing time table and shows the progress of the modified asphalt compositions of Table 3 while they were blended. A PG 64-22 apshalt was modified by blending the components shown in Table 3 at high shear for 1 hour followed by paddle agitation for two hours at 370–380° F. The procedure was necessary to adequately blend the SBS block copolymer into the asphalt in Comparative Example 7 and Inventive Example 8. It is clearly shown in Table 5 that the blend times for the Preblend Additive 1 was significantly shortened compared to the SBS block copolymer addition in Comparative Example 7. The Preblend Additive 1 was dissolved in the asphalt in approximately 30 minutes while the SBS block copolymer took at least 120 minutes to dissolve. This reduced blend time translates into shorter batch times and increased production rates. Thus, the Preblend Additive of Table 3 is readily soluble in asphalts at useful levels. This solubility also results in reduced tendency for the modifiers to separate upon storage.

TABLE 5

| Ingredient | -1 | -2 | -3 | -4 | -5 | -6 | -7 | -8 |
|---|---|---|---|---|---|---|---|---|
| Asphalt, West Coast Blend PG 64-22, | 97 | 96 | 97 | 97 | 96 | 96 | 96 | 96 |
| Preblend Additive 1 | 3 | 4 | 3 | 3 | 4 | 4 | — | — |
| Crosslinker Preblend additive 1 | 0 | 0 | 0.5 | 1 | 0.5 | 1 | 0 | 0.5 |
| Kraton SBS, D 1184 | — | — | — | — | — | — | 4 | 4 |
| Mix/blend: appearance and texture |  |  |  |  |  |  |  |  |
| initial, after Crosslinker Pb |  |  |  |  |  |  |  |  |
| A1 addition | \multicolumn{6}{c}{small Undissolved particles} | \multicolumn{2}{c}{particles present} |
| 15 minutes | \multicolumn{6}{c}{nearly all dissolved and dispersed} | \multicolumn{2}{c}{particles present} |
| 30 minutes | \multicolumn{6}{c}{smooth and homogeneous} | \multicolumn{2}{c}{nearly dissolved} |
| 60 minutes | \multicolumn{6}{c}{smooth and homogeneous} | \multicolumn{2}{c}{and dispersed} |
| 120 minutes | \multicolumn{6}{c}{smooth and homogeneous} | \multicolumn{2}{c}{smooth homogeneous} |
| Ease of blending | excellent | excellent | excellent | excellent | excellent | excellent | Good | Good |
| Separation/Film formation | \multicolumn{8}{c}{No Visual} |
| Draw Down, undispersed polymer? | \multicolumn{8}{c}{all blends were smooth and homogeneous} |

The invention claimed is:

1. A pellet comprising at least one plastomer, at least one crosslinking agent, and at least one elastomer for use as an asphalt modifier, wherein said plastomer comprises an oxidized polyolefin and wherein said crosslinking agent is present in said pellet in an amount ranging from about 0.1% by weight to about 5% by weight based on the weight of the elastomer.

2. A pellet according to claim 1 wherein said crosslinking agent is at least one selected from the group consisting of elemental sulfur, hydrocarbyl polysulfides, peroxides, and transition metals.

3. A modified asphalt composition comprising at least one plastomer, at least one elastomer, at least one crosslinking agent, and asphalt, wherein said plastomer comprises an oxidized polyolefin and wherein said crosslinking agent is at least one selected from the group consisting of elemental sulfur, hydrocarbyl polysulfides, peroxides, and transition metals.

4. A modified asphalt composition according to claim 3 wherein the amount of said elastomer and said plastomer is sufficient to increase the PG rating of the modified asphalt composition by +1 to +3 grades.

5. A modified asphalt composition according to claim 3, wherein said plastomer is present in said modified asphalt composition in an amount from about 0.1% by weight to about 10% by weight based on the weight of the modified asphalt composition.

6. A modified asphalt composition according to claim 3 wherein said elastomer is present in said modified asphalt composition in an amount from about 0.1% by weight to about 10% by weight based on the weight of the modified asphalt composition.

7. A modified asphalt composition according to claim 3 wherein said crosslinking agent is present in said modified asphalt composition in an amount from about 0.1% by weight to about 2% by weight based on the weight of the modified asphalt composition.

8. A modified asphalt composition according to claim 3 wherein said asphalt has a PEN value from about 40 to about 300 dmm.

9. A modified asphalt composition according to claim 3 wherein said asphalt has an AC value from about 2.5 to about 40 hundreds of poises.

10. A modified asphalt composition according to claim 3 wherein said asphalt has an AR value from about 1,000 to about 16,000 poises.

11. A modified asphalt composition according to claim 3 wherein said plastomer is at least one homopolymer having a density from about 0.92 to about 1.1 g/cm$^3$ at 25° C.

12. A modified asphalt composition according to claim 3 wherein said plastomer is oxidized polyethylene.

13. A modified asphalt composition according to claim 3 wherein said plastomer has at least one property in the following ranges: an acid number from about 0.1 to about 50, a needle penetration hardness less than 50 dmm at 25° C., and a viscosity from about 1 to about 100,000 cP at 135° C.

14. A modified asphalt composition according to claim 3 wherein said plastomer is an oxidized polyethylene homopolymer having at least one of the following properties: a density from about 0.92 to about 1.1 g/cm$^3$, a hardness less than 1.5 dmm at 25° C., an acid number from about 5 to about 41, and a viscosity from about 800 to about 8,000 cP at 125° C.

15. A modified asphalt composition according to claim 3 wherein said elastomer is a synthetic rubber produced from monomers obtained from the cracking and refining of petroleum.

16. A modified asphalt composition according to claim 15 wherein said monomers are selected from the group consisting of styrene, butadiene, carboxylated butadiene, isobutylene, isoprene, carboxylated isoprene, chloroprene, ethylene, propylene, acrylonitrile, and mixtures thereof.

17. A modified asphalt composition according to claim 3 wherein said elastomer is a block copolymer of at least one conjugated diene and at least one monoalkenyl aromatic hydrocarbon.

18. A modified asphalt composition according to claim 17 wherein said conjugated diene is at least one selected from the group consisting of butadiene, isoprene, chloroprene, carboxylated butadiene, and carboxylated isoprene.

19. A modified asphalt composition according to claim 18 wherein said conjugated diene is butadiene or isoprene.

20. A modified asphalt composition according to claim 17 wherein said monoalkyenyl aromatic hydrocarbon is styrene.

21. A modified asphalt composition according to claim 17 wherein said block copolymer has a general formula A-B-A or $(A-B)_nX$; wherein each A block is a monoalkyenyl aromatic hydrocarbon polymer block, each B block is a conjugated diolefin polymer block, X is a coupling agent and n is an integer from 2 to about 30.

22. A modified asphalt composition according to claim 17 wherein the configuration of said block copolymer is linear, radial, star, or tapered.

23. A modified asphalt composition according to claim 17 wherein said block copolymer has a number average molecular weight from about 30,000 to about 300,000.

24. A modified asphalt composition according to claim 21 wherein said conjugated diene is butadiene and said monoalkyenyl aromatic hydrocarbon is styrene and the amount of styrene repeating units in said block copolymer ranges from about 15% by weight to about 50% by weight based on the weight of said block copolymer with the remainder being repeating units derived from butadiene.

25. A modified asphalt composition according to claim 17 wherein said block copolymer is a styrene-butadiene block copolymers having a number average molecular weight ranging from about 50,000 to about 200,000.

26. A modified asphalt composition according to claim 3 wherein said polysulfide is at least one selected from the group consisting of dihexyl disulfide, dioctyl disulfide, didodecyl disulfide, di-tert-dodecyl disulfide, dihexadecyl disulfide, dihexyl trisulfide, dioctyl trisulfide, dinonyl trisulfide, di-tert-dodecyl trisulfide, dinonyl trisulfide, di-tert-dodecyl trisulfide, dihexadecyl trisulfide, dihexyl tetrasulfide, dioctyl tetrasulfide, dihexadecyl tetrasulfide, dioctyl tetrasulfide, dinonyl tetrasulfide, di-tert-dodecyl tetrasulfide, dihexadecyl tetrasulfide, dihexyl pentasulfide, dioctyl pentasulfide, dinonyl pentasulfide, di-tert-dodecyl pentasulfide, dihexadecyl pentasulfide, diphenyl trisulfide, dibenzyl trisulfide, diphenyl tetrasulfide, ortho-tolyl tetrasulfide, dibenzyl tetrasulfide, dibenzyl pentasulfide, diallyl pentasulfide, tetramethyltetrathiane, and mixtures thereof.

27. A modified asphalt composition according to claim 3 wherein said peroxide is selected from the group consisting of hydroperoxides, dialkyl peroxides, peroxydicarbonates, diacyl peroxides, and peroxyesters.

28. A modified asphalt composition according to claim 3 wherein said transition metal compound is at least one selected from the group consisting of zinc compounds, nickel compounds, and titanium compounds.

29. A hot mix asphalt composition comprising said modified asphalt composition of claim 3 and aggregate.

30. A process for producing a modified asphalt composition comprising contacting at least one plastomer, at least one elastomer, at least one crosslinking agent and asphalt, wherein said plastomer comprises an oxidized polyolefin and wherein said crosslinking agent is at least one selected from the group consisting of elemental sulfur, hydrocarbyl polysulfides, peroxides, and transition metals.

31. A process for producing a modified asphalt composition said process comprising:

1) contacting at least one plastomer, at least one elastomer, and at least one crosslinking agent to produce a pellet, wherein said plastomer is oxidized polyethylene; and
2) adding said pellet to asphalt in a mixing zone to produce said modified asphalt composition.

32. A process according to claim 31 wherein said elastomer is styrene-butadiene-styrene block copolymer.

33. A process for producing a modified asphalt composition said process comprising:
1) contacting at least one plastomer and at least one elastomer in an extruder zone to produce a plastomer/elastomer pellet;
2) contacting at least one plastomer and at least one crosslinking agent in an extruder zone to produce a plastomer/crosslinking agent pellet;
3) adding said plastomer/elastomer pellet and said plastomer/crosslinking agent pellet to at least one molten asphalt in a mixing zone to produce a modified asphalt composition;
4) mixing said modified asphalt mixture in said mixing zone to disperse the plastomer and elastomer in said plastomer/elastomer pellet to produce the modified asphalt composition.

34. A process according to claim 33 wherein said plastomer/elastomer pellet and said plastomer/crosslinking agent pellet are added simultaneously to said asphalt.

35. A process according to claim 34 wherein said plastomer is oxidized polyethylene and said elastomer is styrene-butadiene-styrene block copolymer.

36. A process for producing a hot mix asphalt composition comprising contacting at least one plastomer, at least one elastomer, at least one crosslinking agent, asphalt, and aggregate, wherein said plastomer comprises an oxidized polyolefin and wherein said crosslinking agent is at least one selected from the group consisting of elemental sulfur, hydrocarbyl polysulfides, peroxides, and transition metals.

37. A process for producing a hot mix asphalt composition said process comprising:
1) contacting at least one plastomer and at least one elastomer in an extruder zone to produce a plastomer/elastomer pellet;
2) contacting at least one plastomer and at least one crosslinking agent in an extruder zone to produce a plastomer/crosslinking agent pellet;
3) adding said plastomer/elastomer pellet and said plastomer/crosslinking agent pellet to at least one molten asphalt in a mixing zone to produce a modified asphalt mixture;
4) mixing said modified asphalt mixture in said mixing zone to disperse the plastomer, elastomer, and crosslinking agent to produce said modified asphalt composition; and
5) contacting said modified asphalt composition with aggregate to produce said hot mix asphalt composition.

38. An article produced by the modified asphalt composition of claim 3.

39. An article produced by the hot mix asphalt composition of claim 29.

40. A pellet comprising at least one plastomer and at least one crosslinking agent for use as an asphalt modifier, wherein said plastomer comprises an oxidized polyolefin and wherein said crosslinking agent is at least one selected from the group consisting of elemental sulfur, hydrocarbyl polysulfides, peroxides, and transition metals.

41. A modified asphalt composition comprising at least one plastomer, at least one elastomer, at least one crosslinking agent, and asphalt, wherein said plastomer comprises an oxidized polyolefin and is present in said modified asphalt composition in an amount from about 0.1% by weight to about 10% by weight based on the weight of the modified asphalt composition.

42. A modified asphalt composition comprising at least one plastomer, at least one elastomer, at least one crosslinking agent, and asphalt, wherein said plastomer comprises an oxidized polyolefin and wherein said elastomer is present in said modified asphalt composition in an amount from about 0.1% by weight to about 10% by weight based on the weight of the modified asphalt composition.

43. A modified asphalt composition comprising at least one plastomer, at least one elastomer, at least one crosslinking agent, and asphalt, wherein said plastomer comprises oxidized polyethylene.

44. A modified asphalt composition according to claim 43 wherein said plastomer is an oxidized polyethylene homopolymer having at least one of the following properties: a density from about 0.92 to about 1.1 g/cm$^3$, a hardness less than 1.5 dmm at 25° C., an acid number from about 5 to about 41, and a viscosity from about 800 to about 8,000 cP at 125° C.

* * * * *